(12) United States Patent
McKinney

(10) Patent No.: US 11,060,659 B2
(45) Date of Patent: Jul. 13, 2021

(54) ADAPTOR FOR PORTABLE ELECTRONIC DEVICES

(71) Applicant: Gregory Neal McKinney, Morrison, CO (US)

(72) Inventor: Gregory Neal McKinney, Morrison, CO (US)

(*) Notice: Subject to any disclaimer, the term of this patent is extended or adjusted under 35 U.S.C. 154(b) by 0 days.

(21) Appl. No.: 16/849,959

(22) Filed: Apr. 15, 2020

(65) Prior Publication Data

US 2020/0326035 A1    Oct. 15, 2020

Related U.S. Application Data

(60) Provisional application No. 62/834,318, filed on Apr. 15, 2019.

(51) Int. Cl.
*F16M 13/02* (2006.01)
*F16M 11/40* (2006.01)

(52) U.S. Cl.
CPC ............ *F16M 13/02* (2013.01); *F16M 11/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,940,204 A * | 7/1990 | Nelson | ................... | F16M 11/10 248/688 |
| 5,028,026 A | 7/1991 | Philipps et al. | | |
| 6,330,948 B1 * | 12/2001 | Leto | ................... | A47J 47/20 211/65 |
| 6,932,309 B1 * | 8/2005 | Corey | ................. | B60R 11/0241 224/483 |
| 9,958,107 B1 * | 5/2018 | Hobbs | ..................... | H04M 1/00 |
| 10,836,449 B2 * | 11/2020 | Lin | ......................... | B62K 19/40 |
| 2005/0045681 A1 * | 3/2005 | Hancock | ............. | B60R 11/0205 224/401 |
| 2008/0116336 A1 | 5/2008 | Hsiung | | |
| 2010/0178048 A1 | 7/2010 | Zunker | | |
| 2010/0294908 A1 | 11/2010 | Mish et al. | | |
| 2012/0118770 A1 | 5/2012 | Valls et al. | | |
| 2013/0233986 A1 * | 9/2013 | Rasheta | ................. | F16M 11/06 248/205.1 |

(Continued)

*Primary Examiner* — Monica E Millner
(74) *Attorney, Agent, or Firm* — McInnes & McLane, LLP

(57) ABSTRACT

An adaptor that attaches to a portable electronic device and is configured to removably receive a user-chosen accessory and that supports the portable electronic device on or to a structure is disclosed. The adaptor allows for the use of different accessories with the portable electronic device, thus providing a level of customization for the user. The adaptor includes a mounting member for supporting the adaptor to the portable electronic device, a body, and at least one receiving bracket supported on the body, the receiving bracket removably attaching the accessory to the adaptor. The mounting member defines a slot sized to receive a grip that is attached to the portable electronic device. The side edges of the mounting member are spaced apart a sufficient distance to allow the grip device to be slid or otherwise received into slot in snug engagement with the side edges so that the adaptor does not disengage from the portable electronic device unintentionally.

20 Claims, 14 Drawing Sheets

(56) References Cited

U.S. PATENT DOCUMENTS

| | | | |
|---|---|---|---|
| 2013/0299652 A1* | 11/2013 | Graham | F16M 11/041 |
| | | | 248/205.1 |
| 2013/0334070 A1 | 12/2013 | Adelman et al. | |
| 2014/0346306 A1 | 11/2014 | Mayfield | |
| 2015/0028175 A1* | 1/2015 | Larson | F16M 11/38 |
| | | | 248/451 |
| 2015/0284160 A1 | 10/2015 | Case et al. | |
| 2016/0010788 A1 | 1/2016 | Blevins | |
| 2016/0134733 A1 | 5/2016 | Murphey et al. | |
| 2016/0381259 A1* | 12/2016 | Johnson | F16M 13/04 |
| | | | 348/158 |
| 2017/0314732 A1* | 11/2017 | Minn | B60R 11/0252 |
| 2017/0349116 A1* | 12/2017 | Liao | F16B 7/14 |
| 2018/0209584 A1* | 7/2018 | Stutesman | H04M 1/04 |
| 2019/0049063 A1 | 2/2019 | Forbes et al. | |
| 2019/0174914 A1* | 6/2019 | Gallup | A47B 23/04 |

* cited by examiner

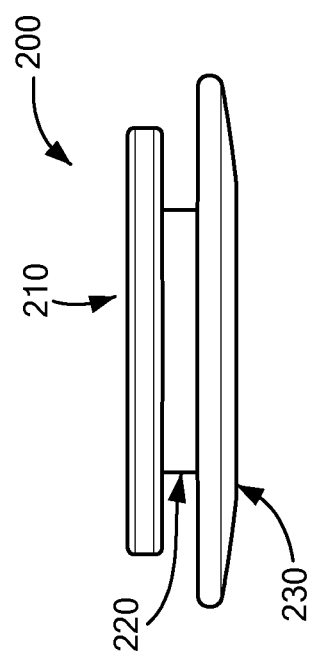
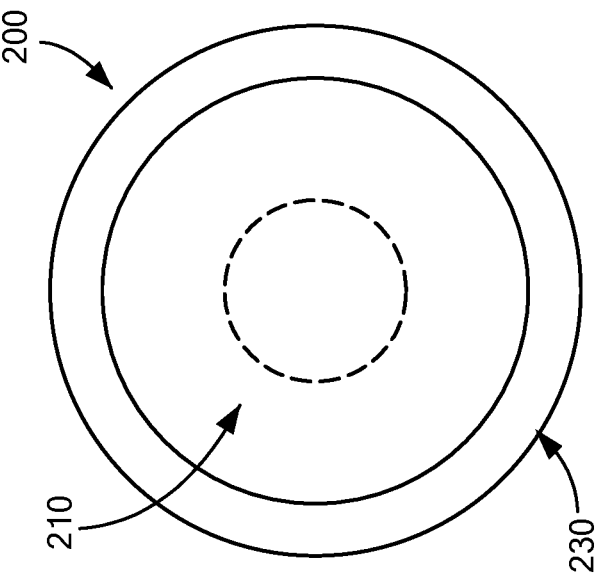
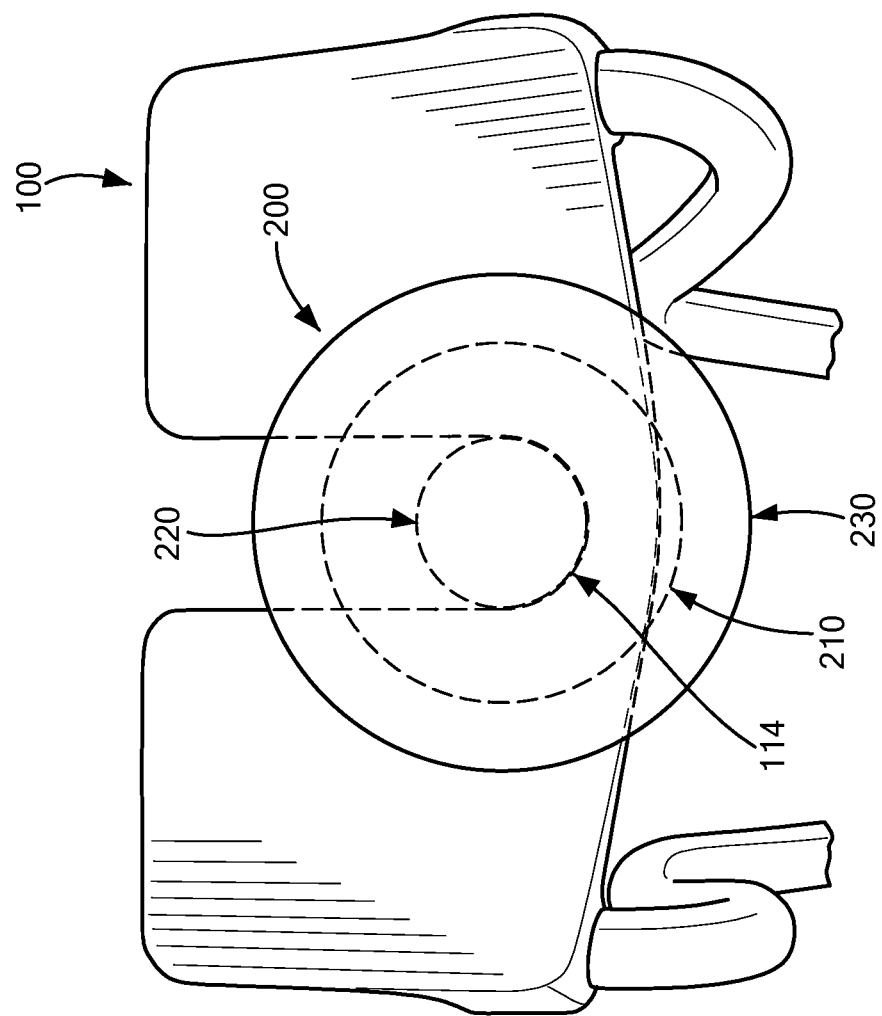

ADAPTOR FOR PORTABLE ELECTRONIC DEVICES

RELATED APPLICATIONS

This patent claims priority to U.S. provisional application 62/834,318 filed Apr. 15, 2019, which is incorporated here by reference in its entirety.

TECHNICAL FIELD

The present disclosure relates generally to an adaptor for attachment of accessories to portable electronic devices to provide the user with a choice for customization, and more particularly but not exclusively, to an adaptor that removably attaches to a portable electronic device and is configured to removably receive a user-chosen accessory to support the portable electronic device on or to a structure.

BACKGROUND

Cell phone and other portable electronic devices such as tablets are ubiquitous, with individuals using them as computers, cameras, exercise trackers, navigational tools, fitness tools, to watch movies, and to entertain young children, among numerous other uses. However, to accomplish many of these tasks, without more, an individual would need to physically hold and position the device, which can be tiring, annoying, impracticable and at times dangerous. Various accessories and add-ons have been developed to allow for use of portable electronic devices without an individual needing to hold the device, but these accessories are often bulky and/or are only suitable for one specific activity.

SUMMARY

While many accessories exist for portable electronic devices to enable use without an individual directly holding them, such accessories are generally not customizable by the user, but instead have pre-determined positions and are designed for specific uses. Because people take their portable electronic devices with them wherever they go, there are various scenarios where different accessories would be desirable for a specific use. In addition, the ease of attaching and removing the accessory from the portable electronic device is advantageous since many are kept in the pocket of the user and additional bulk added to the device is considered undesirable by some.

An adaptor that attaches to a portable electronic device and is configured to removably receive a user-chosen accessory, and which supports the portable electronic device on or to a structure is disclosed herein. The adaptor allows for the use of different accessories, thus providing a level of customization for the user. The adaptor includes a mounting member for supporting the adaptor to the portable electronic device, a body, and at least one receiving arm supported on the body, the receiving arm supporting a corresponding receiving bracket, which together guide and support the accessory on the adaptor.

In one embodiment, the mounting member attaches the adaptor to the portable electronic device by a friction fit with a grip device that is secured to the portable electronic device. The side edges of the mounting member are spaced apart a sufficient distance to allow the grip device to be slid or otherwise received into a slot formed therein. The grip device is in snug engagement with the side edges so that the adaptor does not disengage from the portable electronic device unintentionally.

In another embodiment, each bracket arm includes an upper portion that are curved inward toward each other to assist in holding the accessory in place once received by the bracket. Each of the bracket arms are spaced apart so that when the accessory has been received therein, each bracket arm is in frictional contact with the accessory to prevent it from inadvertently moving or disengaging from the receiving bracket(s).

BRIEF DESCRIPTION OF THE DRAWINGS

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments and are incorporated in and constitute a part of this specification but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

FIG. 7A is a side elevational view of an exemplary grip device for use with the adaptor of FIG. 1 in accordance with the present disclosure;

FIG. 7B is a top plan view of the exemplary grip device of FIG. 7A;

FIG. 7C is a bottom perspective view of the adaptor of FIG. 1 in combination with the accessory and the exemplary grip device of FIG. 7A;

FIG. 8A top perspective view of the adaptor in accordance with a second embodiment of the present disclosure;

DETAILED DESCRIPTION OF THE ILLUSTRATIVE EMBODIMENTS

The examples of the apparatus discussed herein are not limited in application to the details of construction and the arrangement of components set forth in the following description or illustrated in the accompanying drawings. It will be understood to one of skill in the art that the apparatus is capable of implementation in other embodiments and of being practiced or carried out in various ways. Examples of specific embodiments are provided herein for illustrative purposes only and are not intended to be limiting. Also, the phraseology and terminology used herein is for the purpose of description and should not be regarded as limiting. Any references to examples, embodiments, components, elements or acts of the apparatus herein referred to in the singular may also embrace embodiments including a plurality, and any references in plural to any embodiment, component, element or act herein may also embrace embodiments including only a singularity (or unitary structure). References in the singular or plural form are not intended to limit the presently disclosed apparatus, its components, acts, or elements. As used herein, the singular forms "a", "an" and "the" are intended to include the plural forms as well, unless the context clearly indicates otherwise. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
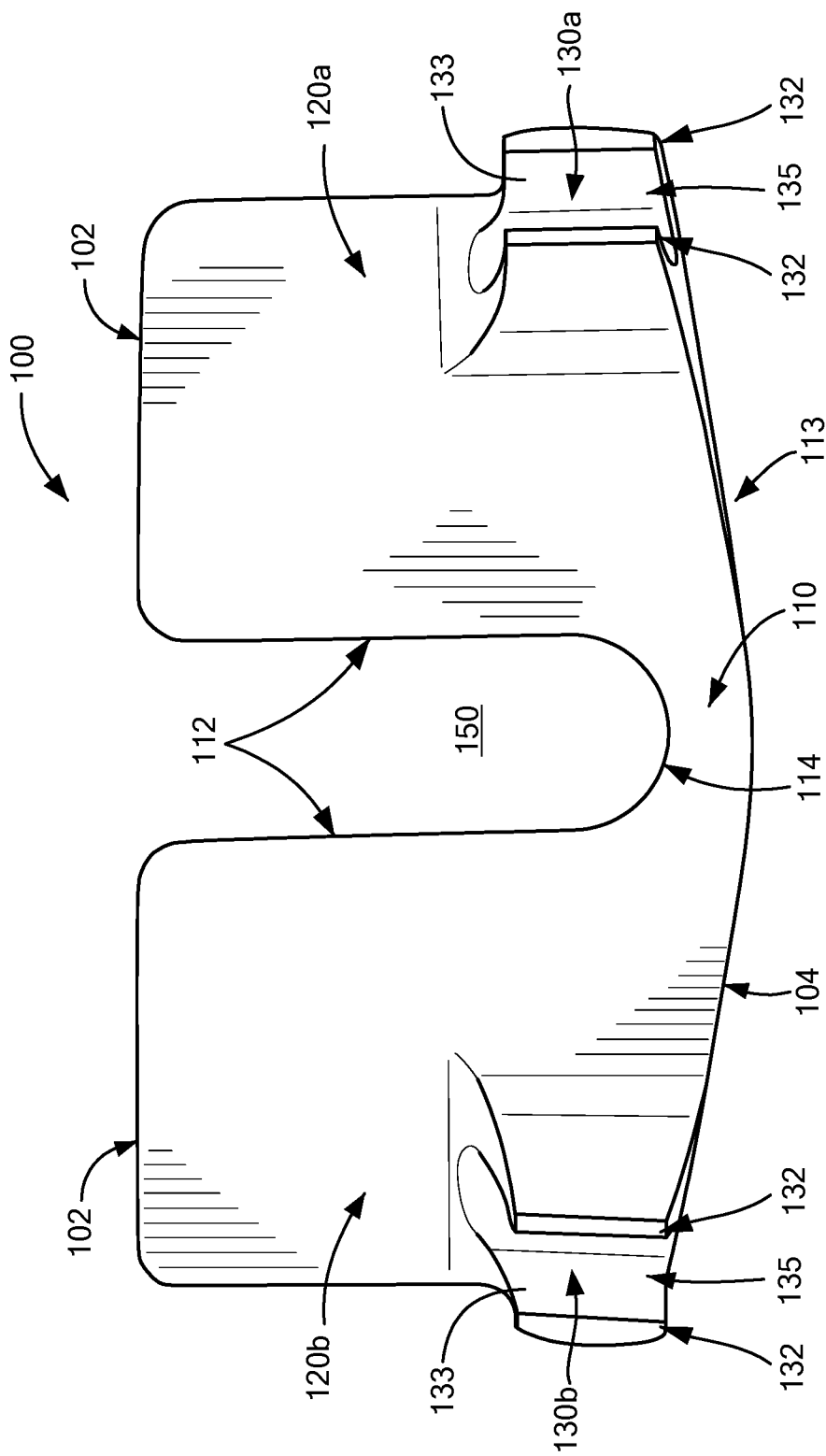
FIG. 1 is a top perspective view of an adaptor in accordance with a first embodiment of the present disclosure.
Figure 2:
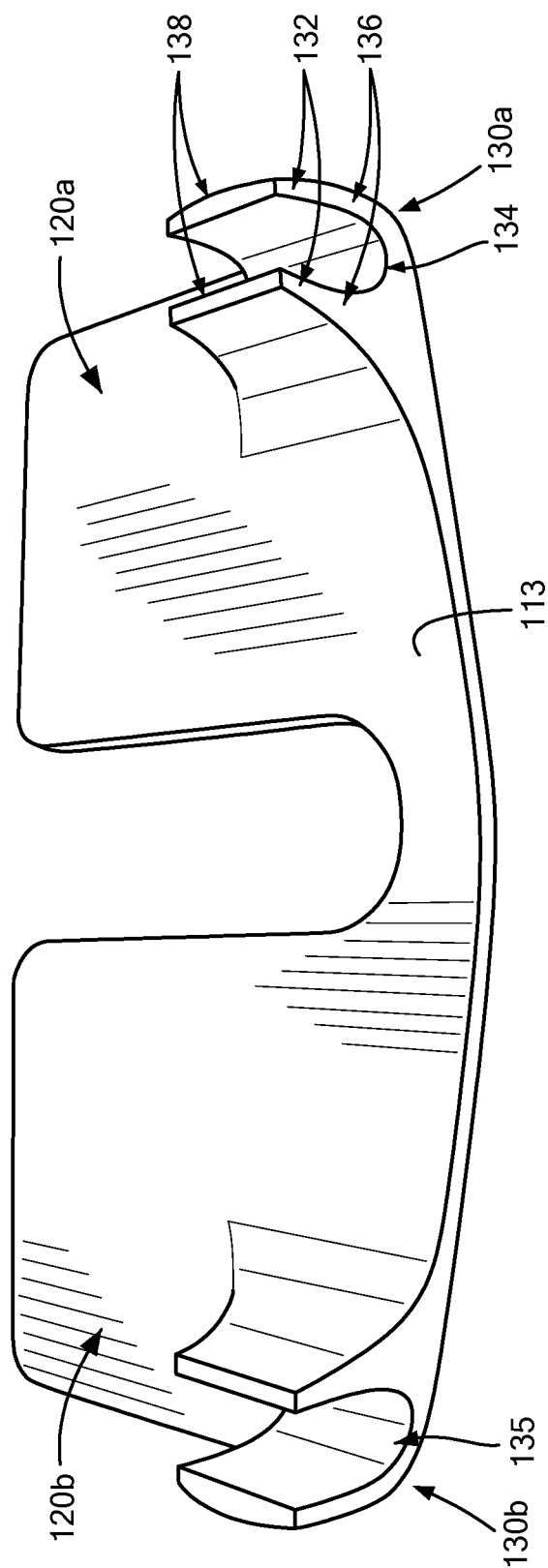
FIG. 2 is a side perspective view of the adaptor of FIG. 1.
Figure 3:
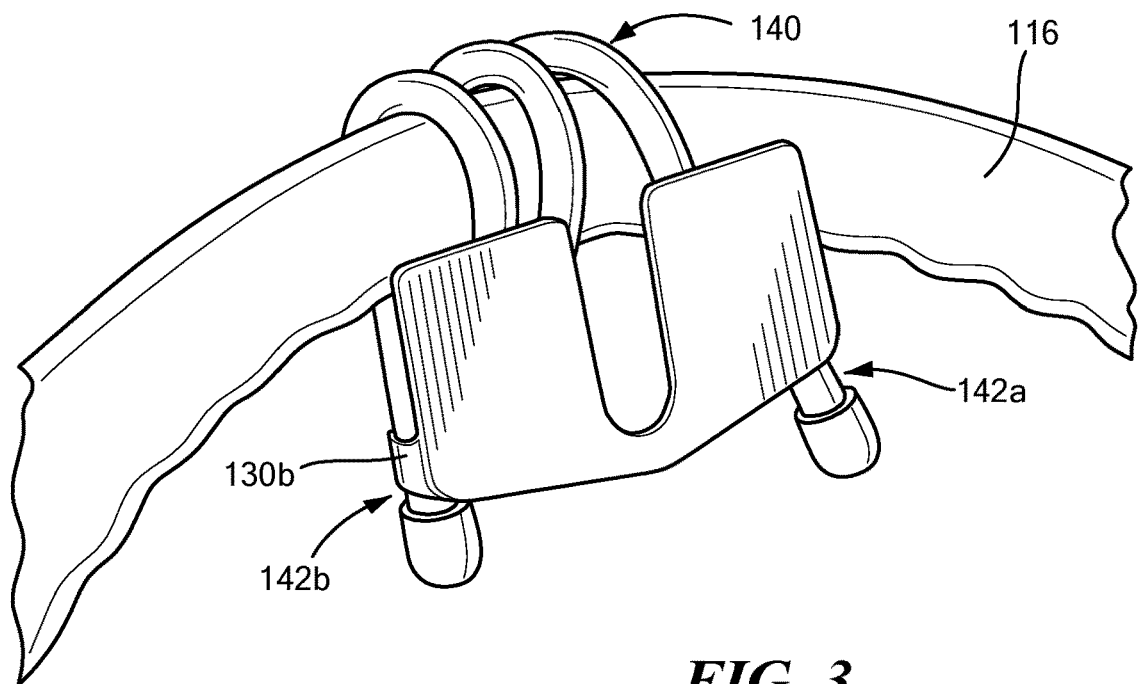
FIGS. 3-4 are perspective views of the adaptor of FIG. 1 in use with an accessory.
Figure 4:
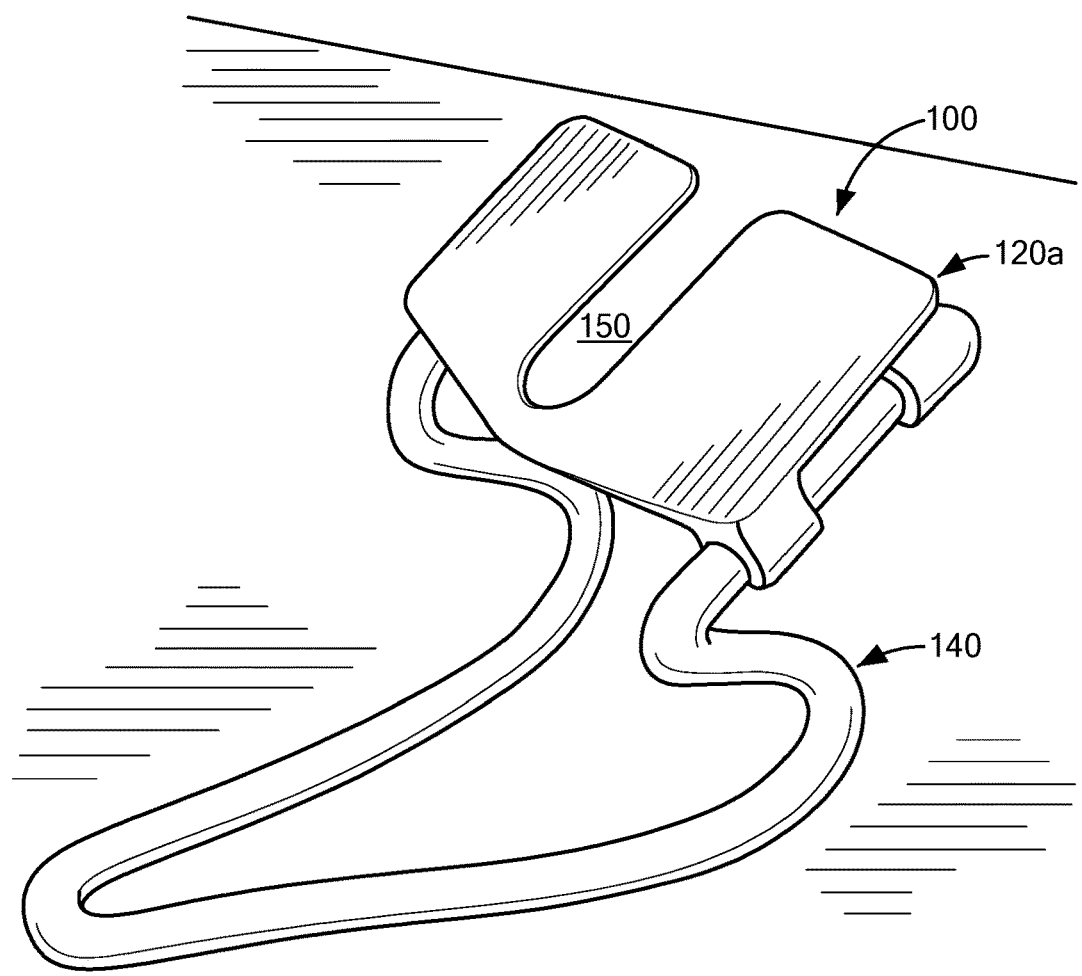
Figure 5:
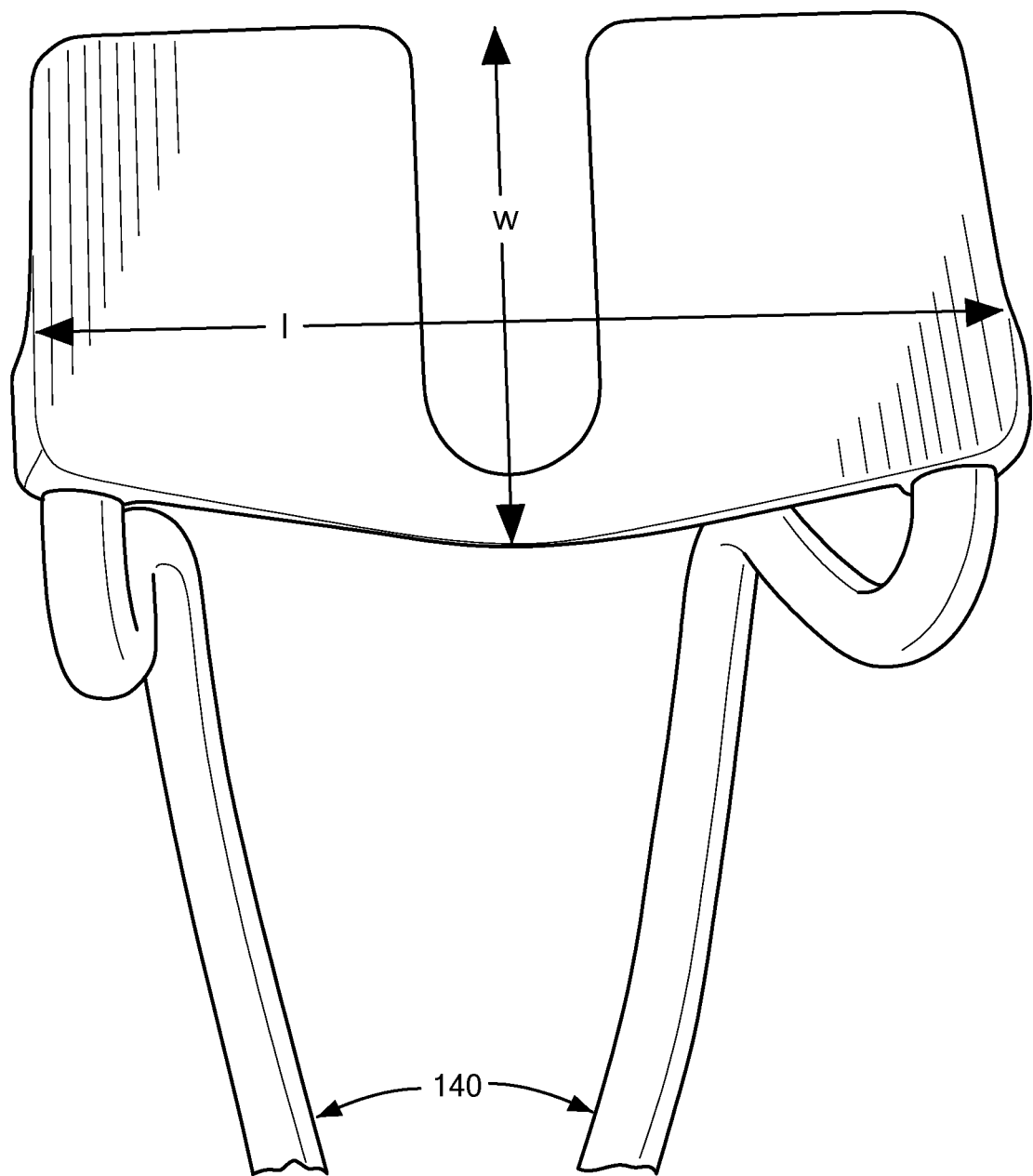
FIG. 5 is a bottom perspective view of the adaptor of FIG. 1 in combination with an accessory.

Referring initially to FIGS. 1-6, the present disclosure is generally directed to an adaptor 100 including a mounting member 110 for supporting the adaptor 100 on a surface, such as the surface of a portable electronic device 111. The adapter 100 includes a body 113 having a top edge 102 and a bottom edge 104 and at least one receiving arm 120*a* for supporting a corresponding receiving bracket 130*a*, which together guide and support an accessory 140 used to support the electronic mobile device on or to a structure 116, for example a steering wheel as shown in FIG. 3. In the exemplary embodiment of FIG. 1, the adaptor body 113 and the at least one receiving arm 120*a* together form a primarily planar surface. In some embodiments, the adaptor body 113 and the receiving arm(s) 120*a* and 120*b* from a unitary piece, as shown in FIG. 1. In other embodiments, the adaptor body 113 and the receiving arm(s) 120*a* and 120*b* may be separate structures that are secured to each other.

Figure 13:
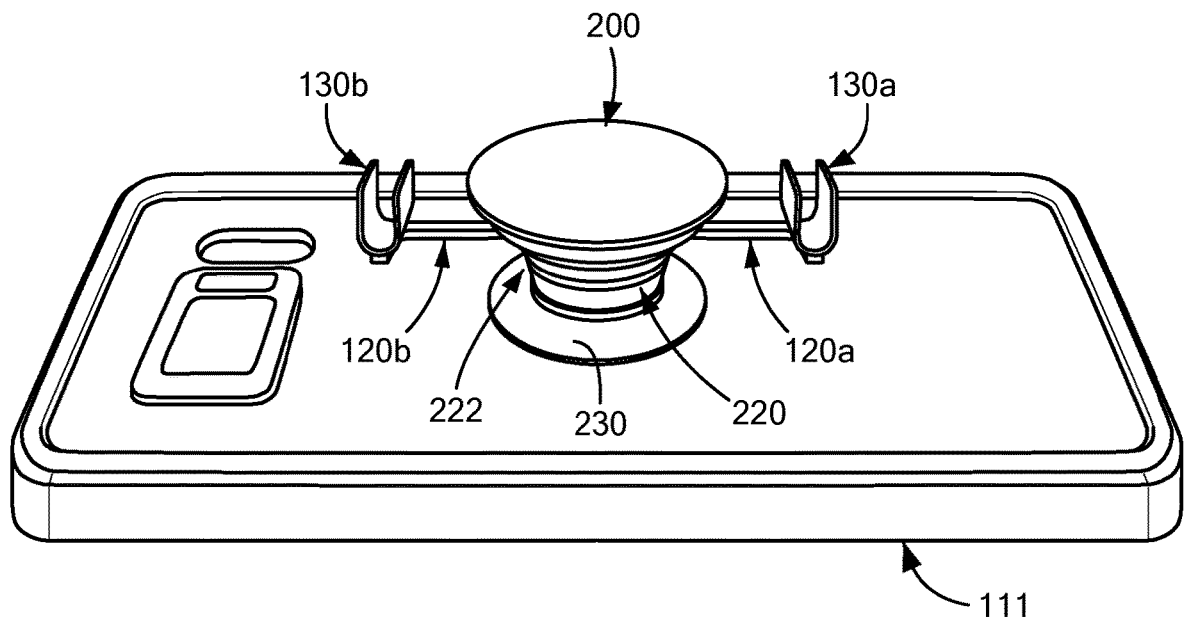
FIGS. 13 and 14 are pictorial representations of the adaptor of FIGS. 9 and 10 supported on a portable electronic device in accordance with the present disclosure.
Figure 14:
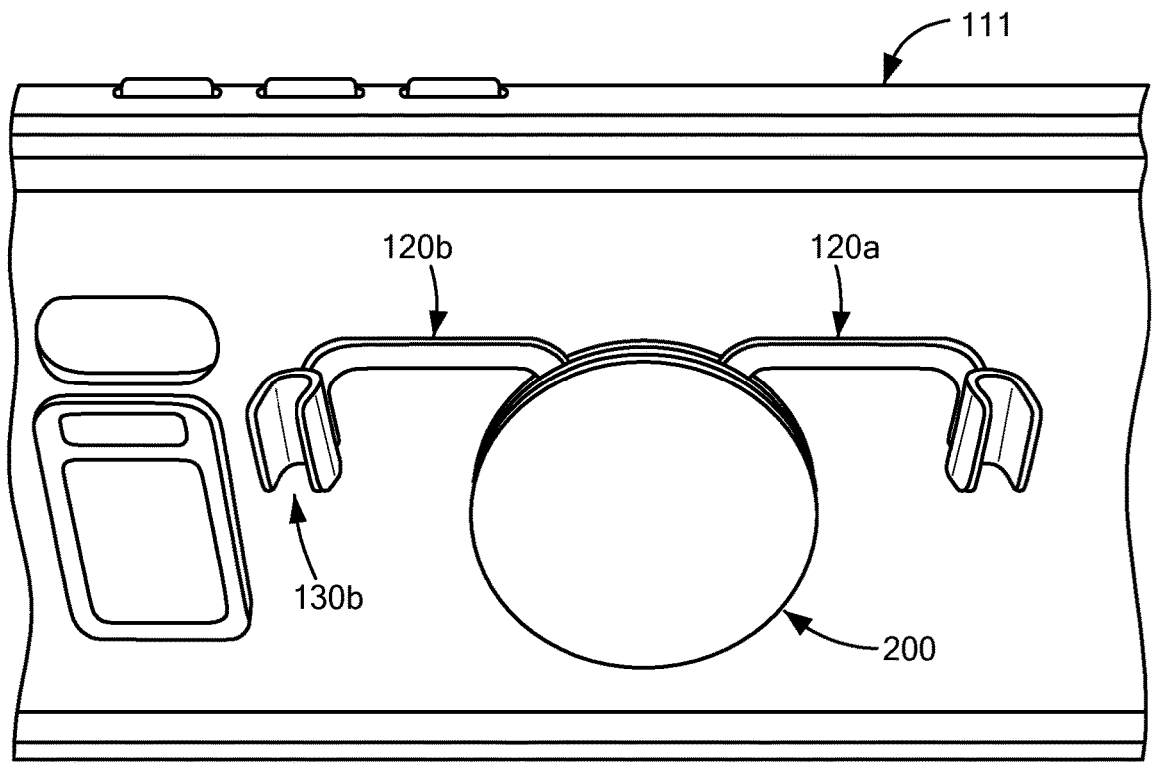

The mounting member 110 defines a slot or channel 150 to receive a grip device 200, the slot 150 being bounded by two opposing side edges 112 connected by a lower edge 114. The side edges 112 are spaced apart a sufficient distance to allow the grip device 200 to be slid or otherwise received into slot 150 and come to rest adjacent the lower edge 114. The lower edge 114 can be any shape, such as curved or straight. In certain embodiments, the shape of the lower edge 114 corresponds to the shape of a receiving portion 220 of the grip device 200. For example, the lower edge 114 may be curved such that it is arcuate and forms a "U" with the side edges 112 to receive a circular grip device; lower edge 114 may be straight so that it is perpendicular to side edges 112 in order to receive a square or rectangular grip device; or lower edge 14 may be pointed to form a "V" shape with the side edges 112 to receive a triangular grip device. One popular circular shaped grip that the adaptor 100 is designed to be utilized with is the POPSOCKET® brand grip sold by PopSockets LLC, of Colorado is illustrated in FIG. 13.

Figure 15:
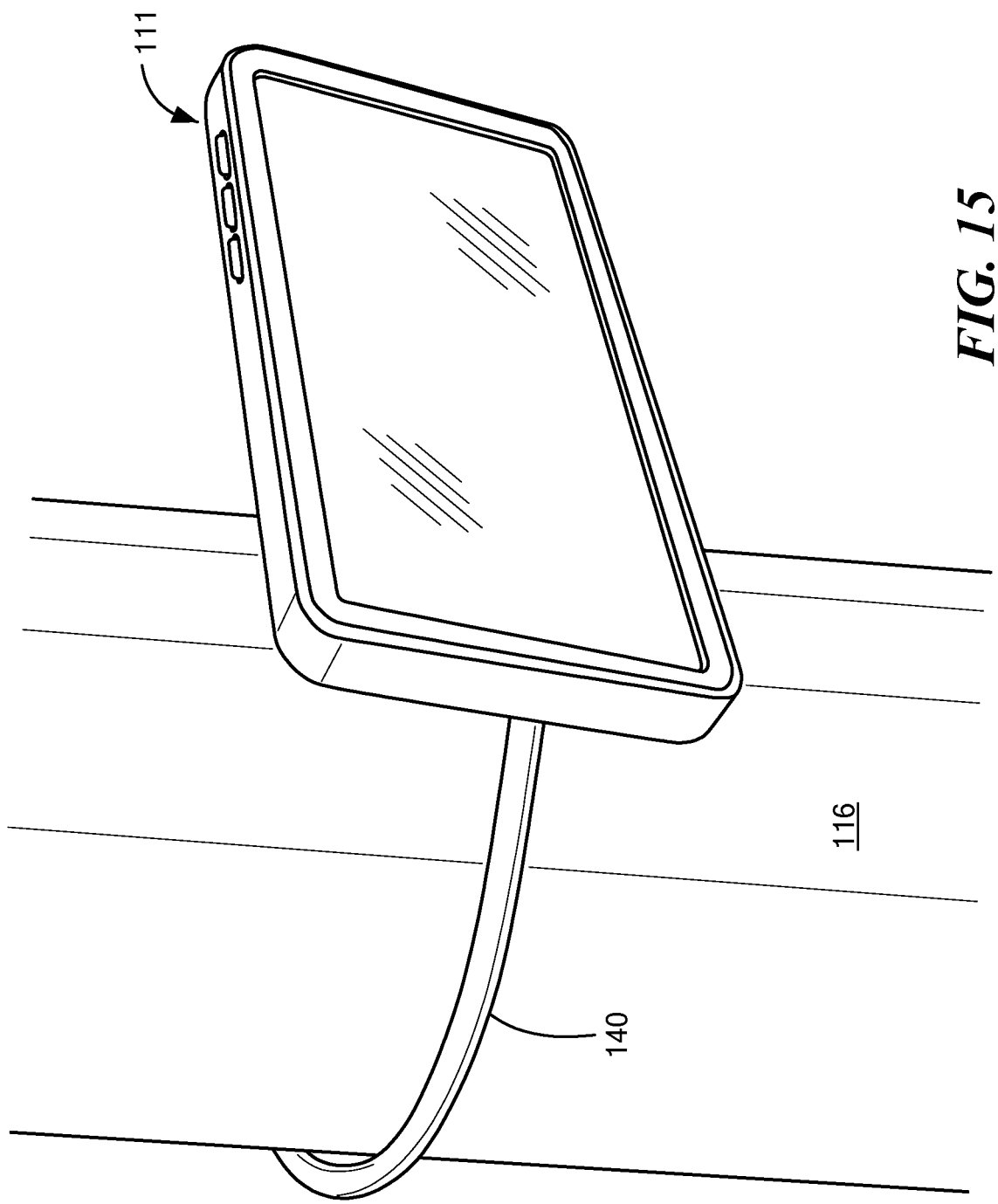
FIG. 15 is a front perspective view of the adaptor of FIGS. 9 and 10 in use with an accessory wrapped around a cylindrical support in accordance with the present disclosure.
Figure 16:
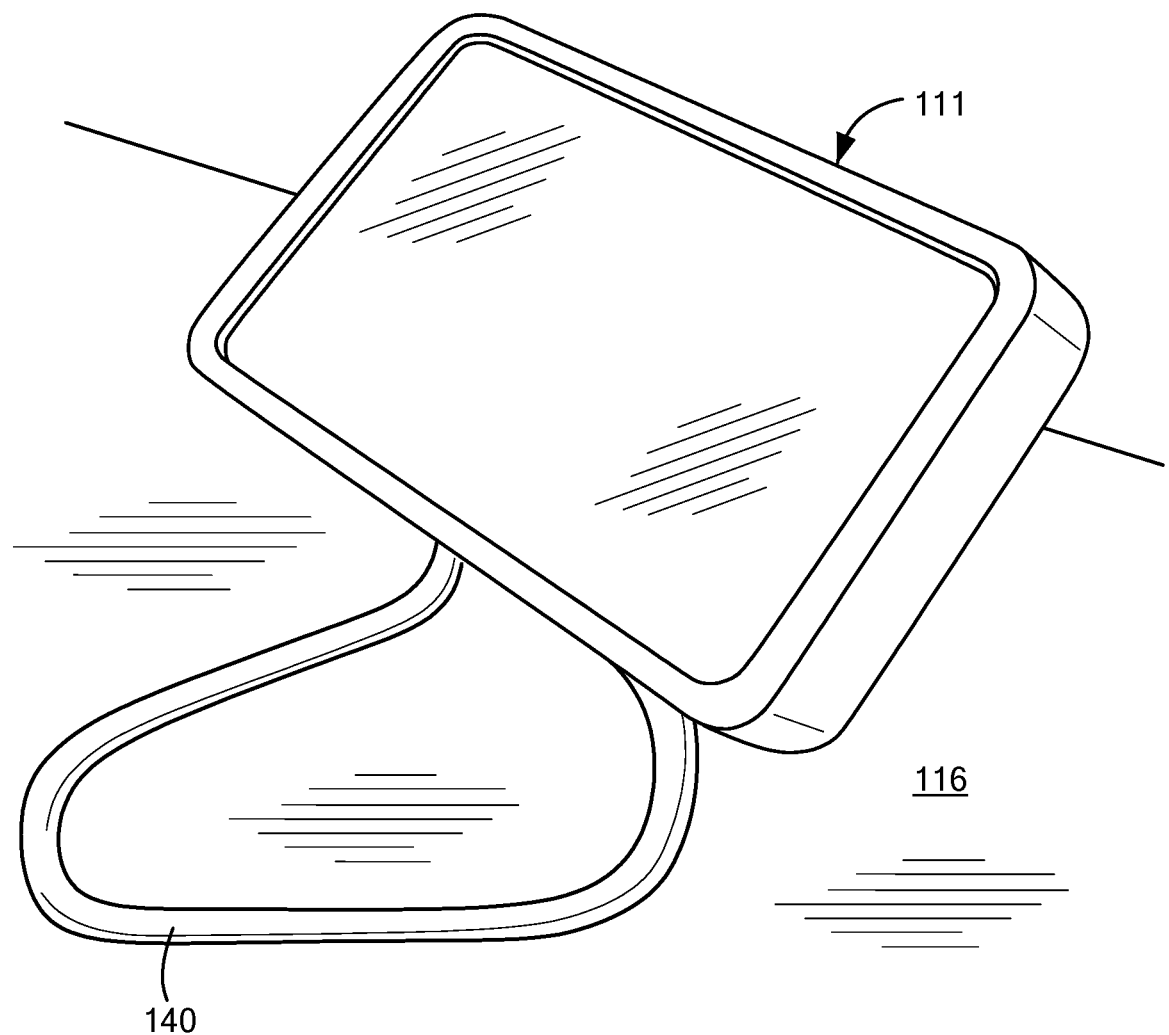
FIG. 16 is a front perspective view of the adaptor of FIG. 1 supported on a portable electronic device and in use with an accessory supported on a planar surface in accordance with the present disclosure.
Figure 17:
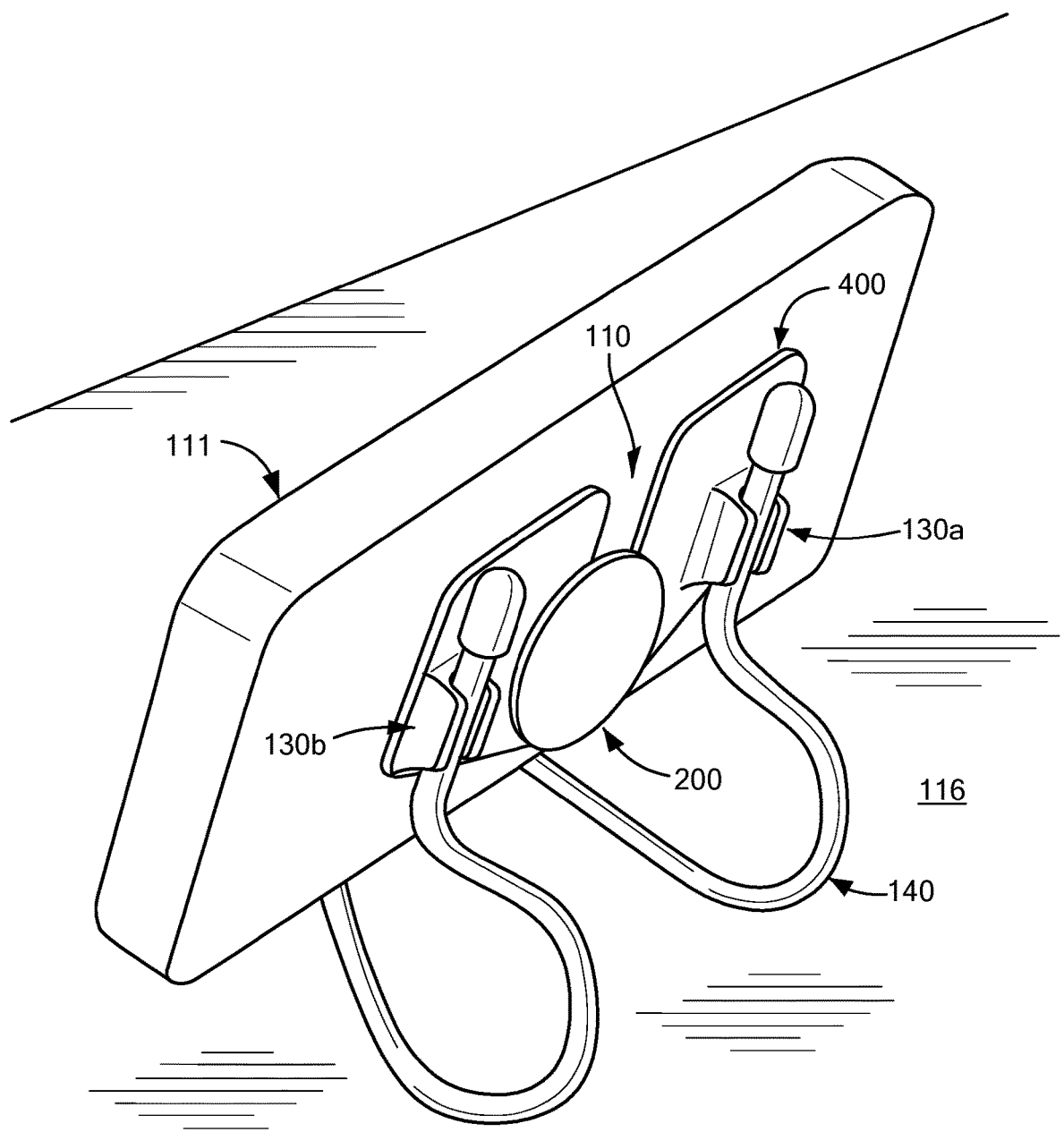
FIG. 17 is a rear perspective view of the adaptor of FIG. 1 supported on a portable electronic device and in use with an accessory supported on a planar surface in accordance with the present disclosure.

Grip devices for mounting to a portable electronic device 111, such as a phone or tablet, are known to those of skill in the art. One embodiment of a grip device 200 for use with the present disclosure shown in FIGS. 7A-7C is generally circular in shape and includes a button 210, a receiving portion 220, and a base 230. Base 230 is secured to a back surface of the portable electronic device (or to a protective cover of the device), while the receiving portion 220 and button 210 are gripped by a user or used as a stand. As illustrated, the exemplary button 210 and base 230 have a wider circumference than the receiving portion 220, and all three parts are generally aligned concentrically with each other. In the present embodiment, the base 230 is larger in circumference than the button 210. In other embodiments, the base 230 has the same or smaller circumference than the button 210. In some embodiments, the sides of the receiving portion 220 of the grip device 200 are slightly concave or tapered, which may assist in holding the grip device in place within slot 150 of adaptor 100. In certain embodiments, the height of the receiving portion 220 may be greater than the thickness of adaptor body 113, but still in snug communication within slot 150 such that the adaptor 100 is removably held in place once engaging the grip device 200. For example, in the embodiment shown in FIG. 13, although the height of the receiving portion 220 is much greater than the thickness of adaptor body 113, a ridge 222 is provided that engages the slot 150, and the grip device also collapses such that the button 210 and base 230 are brought closer together, both of which help hold the grip device within slot 150. Because the grip device 200 engages slot 150 to support the adaptor 100 to the mobile electronic device and the adaptor 100 is not permanently affixed thereto, it is free to rotate around the grip 200. The rotation around the grip device 200 allows the portable electronic device to be positioned at any angle, for example with the portable electronic device 111 in a more vertical orientation as shown in FIG. 15, or a more horizontal orientation as shown in FIG. 16, or at any angle in between.

Figure 8A:
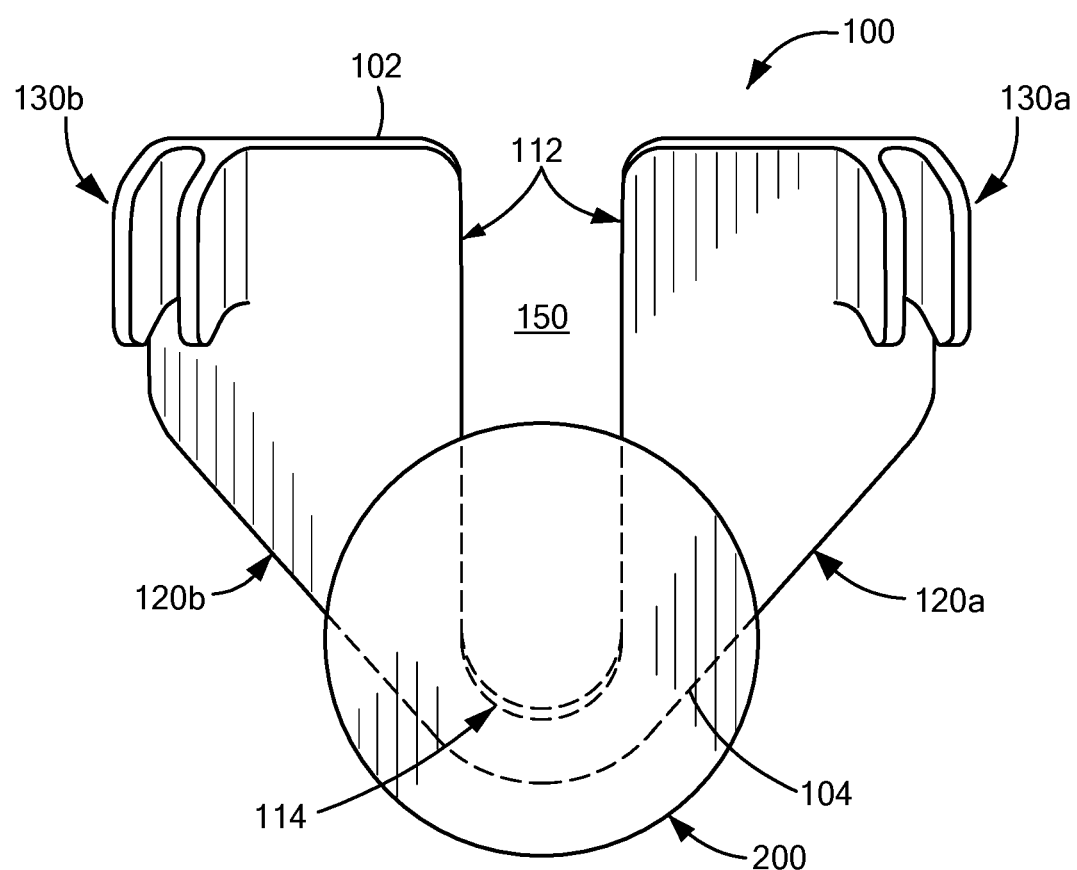

Referring again to FIGS. 1-6 each receiving arm 120*a, b* is positioned on either side of the side edges 112 of mounting member 110. Any number of receiving arms 120 are contemplated in the present disclosure. In the present exemplary embodiment, there are two receiving arms 120*a, b* but other number of receiving arms may be provided. The receiving arms 120*a, b* can also take any number of shapes, such as to roughly resemble a square, rectangle, trapezoid, cylindrical, oval, circular, triangular, or any other shape imaginable. For example, in the present embodiment, the receiving arms roughly resemble a square with rounded edges, whereas in the embodiment shown in FIG. 8A, the receiving arms roughly resemble a trapezoid, and in the embodiment shown in FIGS. 9-10, the receiving arms are a flat rod shape.

Supported by each receiving arm 120*a, b* is at least one corresponding receiving bracket 130*a, b* for removably receiving the accessory 140. As best shown in FIG. 2, each receiving bracket 130a, b includes opposing bracket arms 132 that extend from the surface of the adaptor body 113 and the receiving arms 120a, b. Each bracket arm 132 has a lower portion 136 and an upper portion 138. In certain embodiments the upper portions 138 of each bracket are curved inward toward each other to assist in hold the accessory 140 in place once received by the bracket. As also shown best in FIG. 2, bracket arms 132 are connected by a lower surface 134 extending between the lower portion 136 of each of the bracket arms 132. The bracket arms 132 are spaced apart to receive and removably secure accessory 140 to the adaptor 100. Each of the bracket arms 132 should be spaced apart so that, when the accessory 140 has been received therein, each bracket arm 132 is in frictional contact with the accessory 140 to prevent it from inadvertently disengaging from the receiving bracket(s) 130a, b.

Figure 6:
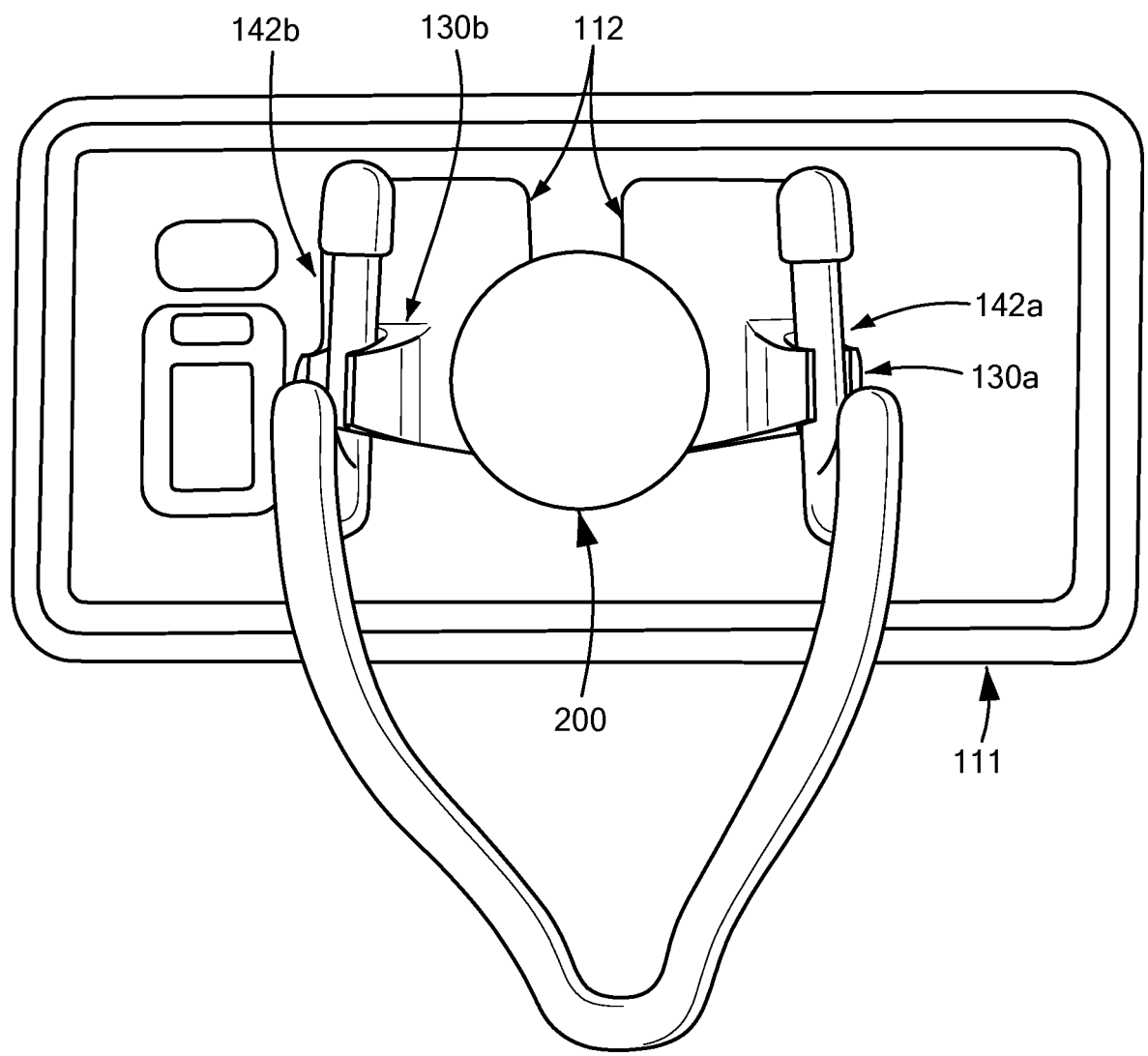
FIG. 6 is a pictorial representation of the adaptor of FIG. 1 supported on a portable electronic device in accordance with the present disclosure.

Any desirable accessory 140 that is capable of mating with the receiving bracket(s) 130a, b is contemplated in the present disclosure, including those of varying length and, if tubular, circumference. For example, but not limitation, a suitable accessory includes any type of cable, cord, rod, handle, etc. whether flexible, stiff, or some combination thereof, such as the flexible cable shown in FIGS. 3-6 and sold under the brand name NITE IZE®, by NITE IZE, Inc. of Colorado. As shown in FIG. 6, the accessory 140 fits into the receiving bracket(s) 130a, b such that the bracket receiving arms 132 and lower surface 134 are in frictional contact with the accessory 140. In certain embodiments, the receiving arms 132 are capable of being moved apart from one another to initially receive the accessory, especially in embodiments in which the upper portions 138 of the receiving arms 132 are curved inward. Once the accessory has passed through the curved upper portions 138, the receiving arms 132 can be moved back toward their original position, either through their own flexibility, or by the user pushing them together, for example if the receiving arms are made of metal.

Figure 8B:
FIG. 8B is a front elevational view of the adaptor of FIG. 8A.
Figure 8C:
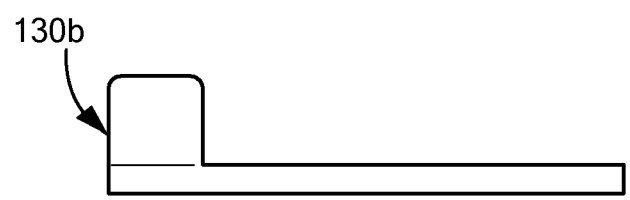
FIG. 8C is a side elevational view of the adaptor in accordance with a second embodiment of the present disclosure.

As with the lower edge 114 of the channel 150, the lower surface 134 of the receiving bracket 130 and the inner surfaces 133 of each of the bracket arms 132 form a slot or channel 135. Likewise, the lower surface 134 can be any shape, such as curved or flat. The shape of the lower surface 134 may generally conform to the shape of the portion of the accessory 140 that is received by the brackets 130a, b, for example as shown in FIGS. 2 and 6 where the lower surface 134 is curved such that it forms a "U" with the bracket arms 132. It is to be understood that the lower edge 114 of the channel 150 can be located above or below the receiving brackets 130a, b, which can be positioned toward the top or bottom edge 102, 104 of adaptor body 113, or any point in between. For example, in the embodiment shown in FIGS. 8A-8C, the lower edge 114 of channel 150 is positioned toward the bottom edge 104 of the adaptor body 113, while the brackets are located toward the top edge 102, such that the lower edge 114 of channel 150 is below the receiving brackets 130a, b. In other embodiments, it is preferable to have the receiving brackets 130a, b in line with the mounting member 110 to prevent the amount of torque that is placed on the grip device once the accessory is mounting to the adaptor 100.

In certain embodiments, such as the embodiment shown in FIGS. 1-6, the bottom edge 104 of the adaptor body 113 may be aligned with the lower surface 134 of brackets 130a, b, such that the brackets extend upward from the bottom edge 104 a distance along each of the corresponding receiving arms 120a, b. The brackets 130a, b can be formed together as a unitary piece with the rest of the adaptor 100, or they can be made as separate components from the adaptor 100 and fixedly attached thereto. For example, but not limitation, as shown in the embodiment in FIG. 10, brackets 130a, b are formed separately and welded to the ends of the receiving arms 120a, b.

The adaptor 100 can be made of any material, such as a hard or semi-hard plastic, a metal material, a plastic coated or painted metal material. The adaptor can have any length 1, width w, or thickness, as desired for use with a portable electronic device. In certain embodiments, the adaptor 100 may have a length and a width such that the adaptor does not extend past the edges of the portable electronic device to which it is mounted. For example, as shown in FIG. 6, the adaptor 100 is both shorter in width and length than the cell phone to which it is mounted. In the case of a tablet, portable laptop computer or touch screen pad, etc., for example, the length and width can be greater than that of a portable cell phone device. With respect to mounting on a cell phone device, the adaptor 100 will usually be mounted such that the width of the adaptor 100 will be lengthwise with respect to the cell phone, as shown in FIG. 6. The thickness of the adaptor may also preferably be less than the length 1 and the width w of the adaptor 100.

Figure 9:
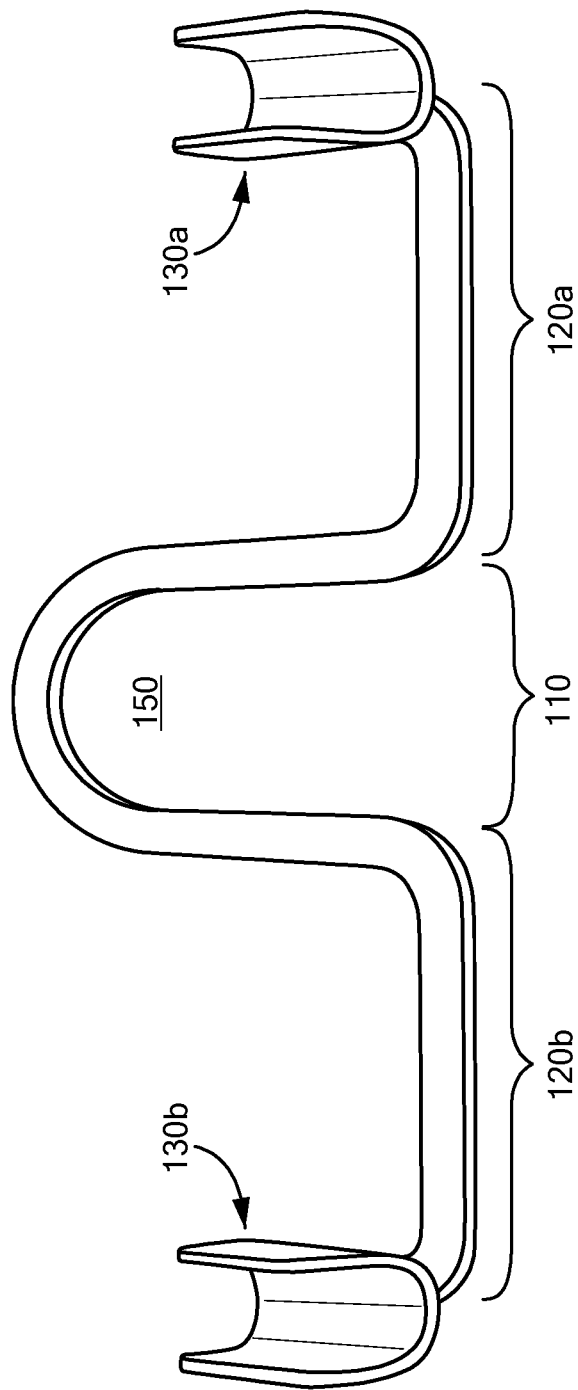
FIGS. 9 and 10 are top perspective views of the adaptor in accordance with a third embodiment of the present disclosure.
Figure 10:
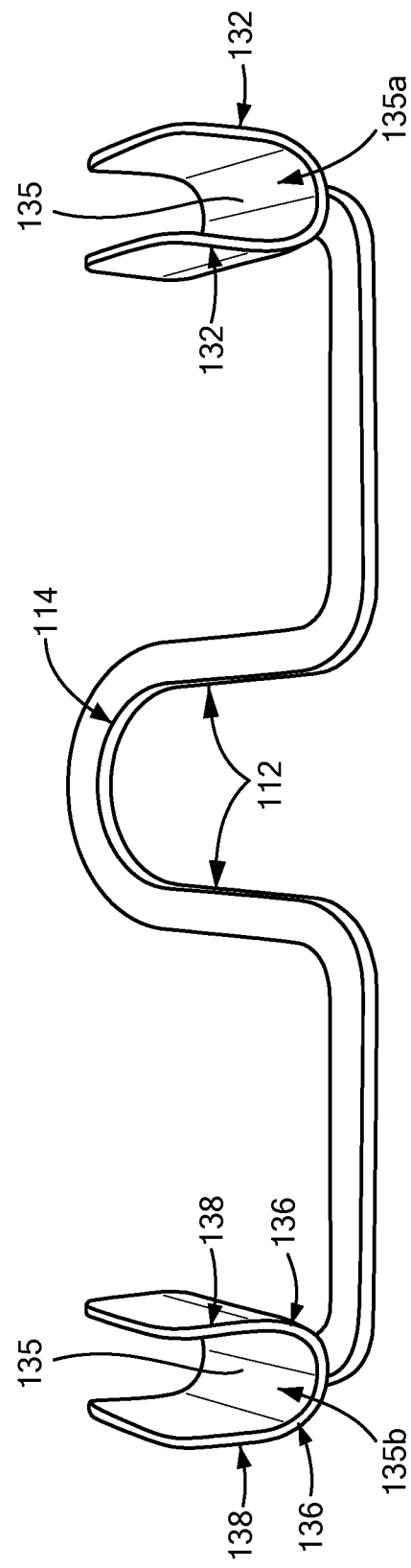

In certain embodiments, the width of the receiving arms 120 is substantially equal to the width of the mounting member 110, as shown in the embodiment of FIG. 9. In other embodiments, such as the embodiment shown in FIGS. 1-6 and the embodiment shown in FIG. 9, the surface area and width of the receiving arms 120 is greater than the mounting member. Even further, in certain embodiments, such as the embodiment shown in FIGS. 1-6 and the embodiment shown in FIG. 9, there is not a clear line of delineation between the receiving arms 120 along the side edges 112 of the mounting member, with the receiving arm extending to just before each of the side edges 11. The surface of the receiving arms 120 can be used for promotional purposes or for placing any type of desired design thereon.

Figure 11:
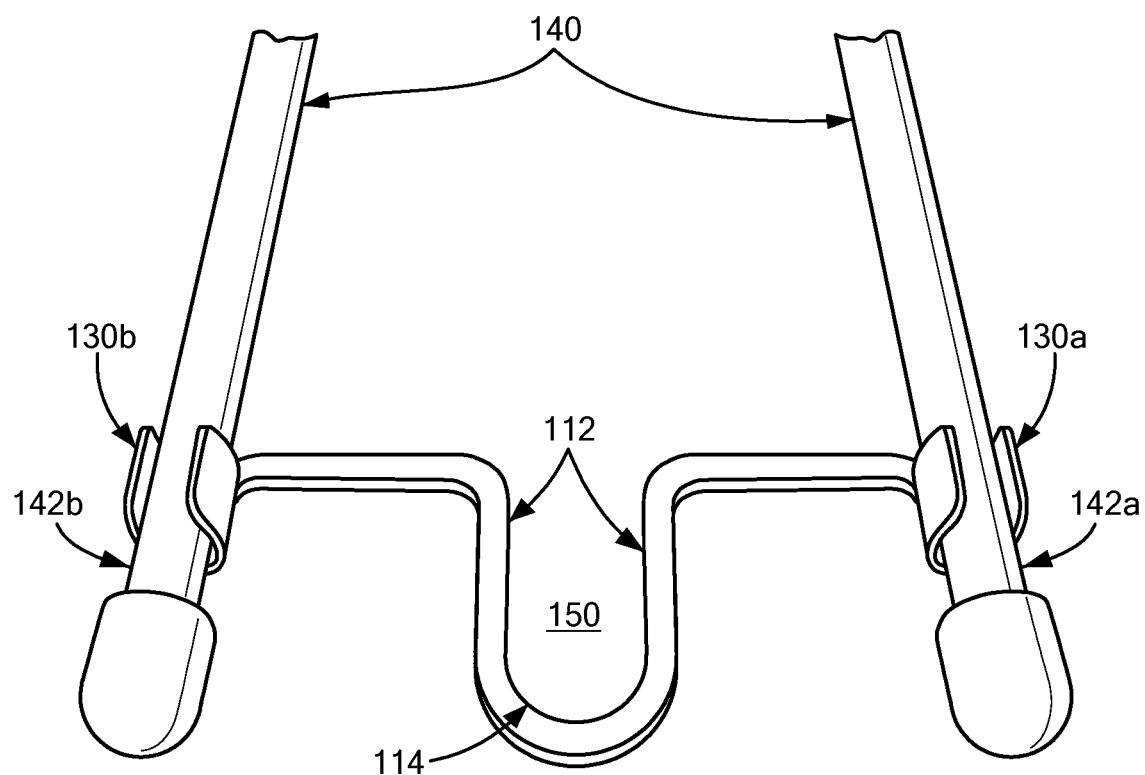
FIG. 11 is a top perspective view of the adaptor of FIGS. 9 and 10 in use with an accessory.
Figure 12:
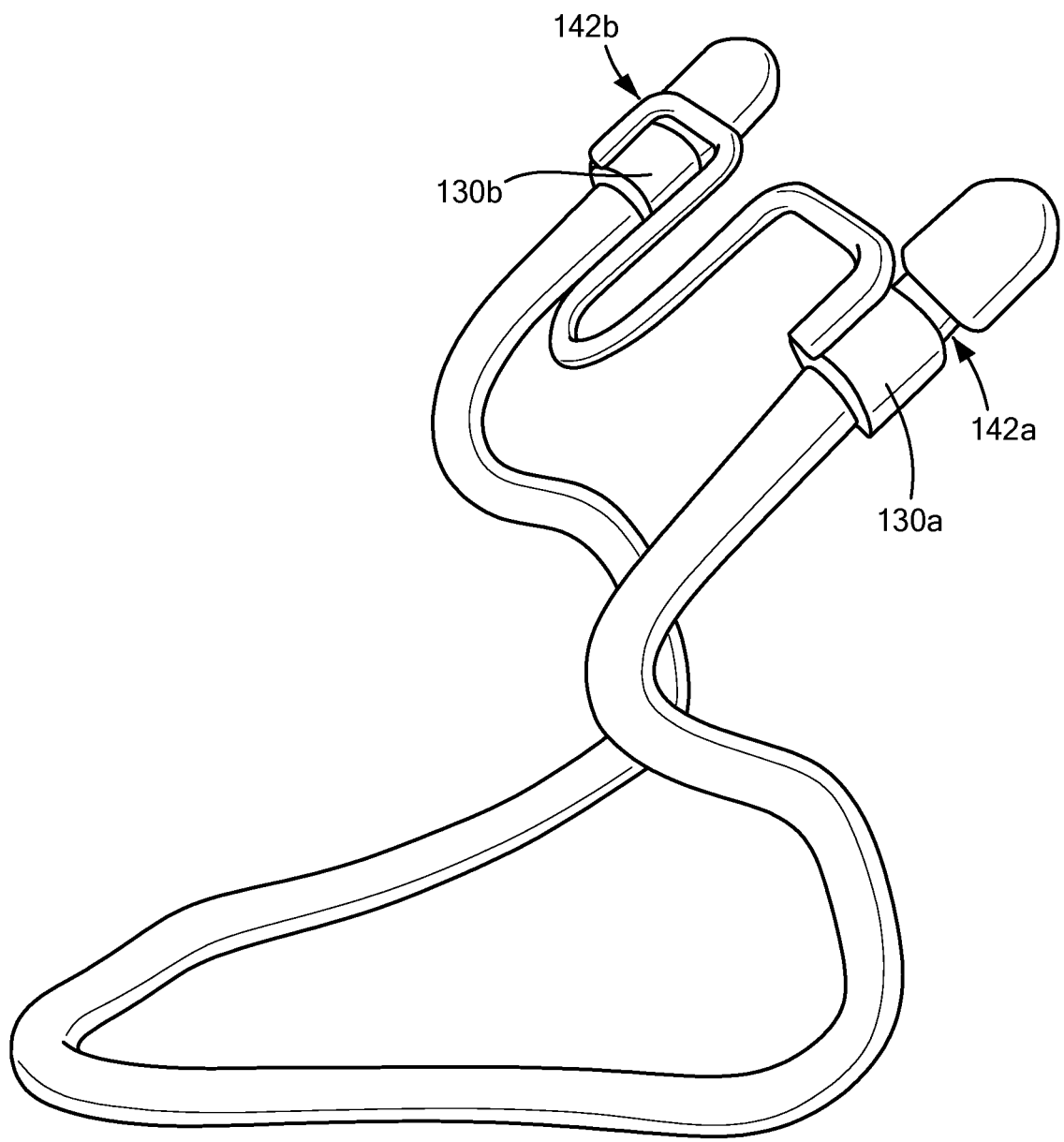
FIG. 12 is a side perspective view of the adaptor of FIGS. 9 and 10 in use with an accessory.

In use, the receiving portion 220 of grip device 200 is slid or otherwise received into the slot 150 of the mounting member 110 of the adaptor 100 for connection therewith. The grip device 200 is inserted along the side edges 112 of the slot 150 of the mounting member 110 and rests adjacent the lower edge 114 of the mounting member 110, for example as shown in FIGS. 7C and 11-12, with the grip device 200 in dotted lines. As described herein above, the grip device 200 has a snug, friction fit within the mounting member 110, which provides a secure attachment that is also removable so that the user can choose to keep the adaptor 100 attached to the grip device, or readily remove it therefrom.

FIG. 6 shows the adaptor 100 attached to the grip device 200, which in turn is mounted to the mobile electronic device 111, and the accessory 140 supported by the adaptor 100. The accessory can be inserted within the receiving brackets 130a, 130b of adaptor 100 either before or after the adaptor is attached to the grip device 200. As shown in the various embodiments, one exemplary accessory includes a first end 142a and a second end 142b received within the receiving brackets 130a, 130b. Once in place on the portable electronic device, the accessory 140 can be used, for example but not limitation, to removably attach the portable electronic device 111 to an object, such as a circular object (as shown in FIG. 3) or a post (as shown in FIG. 15); or as a stand, as shown in FIGS. 4-5 and 16-17; or held by the user to take "selfies," etc. The adaptor 100 can also be rotated to position the portable electronic device 111 at any of a variety of angles, two of which as shown in FIGS. 15 and 16. Because the accessory 140 can be chosen by the user, and can have a variety of lengths, it provides a level of customization for the user not previously available. For example, if a rigid stand is desired, the accessory 140 may take the form of a metal rod shaped to engage both the receiving brackets 130*a*, 130*b* and a support surface, such as a U-shape, may be utilized. However, if a more flexible alternative is desired, for example to wrap around a cylindrical object, the accessory 140 may be a cable tie, or NITE IZE® rubber-coated cables that is available in a variety of sizes and that can be formed, or twisted into a variety of shapes, for example as shown in FIGS. 12-15.

Those skilled in the art will appreciate that the conception, upon which this disclosure is based, may readily be utilized as a basis for designing other products without departing from the spirit and scope of the invention as defined by the appended claims. Therefore, the claims are not to be limited to the specific examples depicted herein. For example, the features of one example disclosed above can be used with the features of another example. Furthermore, various modifications and rearrangements of the parts may be made without departing from the spirit and scope of the underlying inventive concept. For example, the geometric configurations, size and positioning disclosed herein for the adaptor, mounting member, receiving arm and receiving bracket including but not limited to width, length and thickness, may be readily altered depending upon the application, as may the material selection for the components. Thus, the details of these components as set forth in the above-described examples, should not limit the scope of the claims.

Further, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed is:

1. An adaptor for attachment of an accessory to a portable electronic device, the adaptor comprising:
    a body having a top edge, a bottom edge, a front surface and an opposing back surface;
    a mounting member including two opposing side edges and a lower edge together defining a slot, the slot being configured and dimensioned to receive a portion of a grip device;
    at least one receiving bracket supported on the front surface of the body, the at least one receiving bracket including opposing bracket arms extending outwardly from the front surface of the body and forming a channel therebetween configured and dimensioned to receive at least a portion of the accessory therein; and
    wherein the body of the adapter is sized smaller than the back surface of the portable electronic device such that when the grip device is received within the slot of the mounting member the back surface of the body is adjacent the back surface of the portable electronic device, supporting the adaptor.

2. The adaptor of claim 1, wherein the opposing bracket arms each include a lower portion and an upper portion, the upper portion of each opposing bracket arm curving inwardly toward the opposing bracket arm.

3. The adaptor of claim 2, wherein the body includes at least one receiving arm that supports the at least one receiving bracket.

4. The adaptor of claim 3, wherein the at least one receiving arm has a shape selected from the group consisting of square, rectangle, trapezoid, oblong, circular, triangular, and cylindrical.

5. The adaptor of claim 2, wherein the opposing bracket arms each further include a lower surface extending between the lower portion of each of the opposing bracket arms and an inner surface, the lower surface and the inner surface forming the channel.

6. The adaptor of claim 3, wherein the at least one receiving arm and the at least one receiving bracket are a unitary structure.

7. The adaptor of claim 3, wherein the at least one receiving arm and the at least one receiving bracket are separate structures joined together.

8. The adaptor of claim 1, wherein the grip device includes a receiving portion, and the two opposing side edges of the mounting member are spaced apart a sufficient distance to accept the receiving portion of the grip device within the slot and wherein the adaptor is rotatable around the grip device.

9. The adaptor of claim 8, wherein the two opposing side edges of the mounting member are connected by the lower edge having one of a straight or curved shape.

10. The adaptor of claim 1 in combination with the grip device, wherein the grip device includes a base constructed and arranged to be supported by the back surface of the portable electronic device, a button, and a receiving portion connecting the button and the base.

11. The adaptor of claim 10, wherein the receiving portion of the grip device is the portion received within the slot of the mounting member.

12. The adaptor of claim 1, wherein at least a portion of the accessory is removably supported within the channel of the at least one receiving bracket to support the accessory on the adaptor, and wherein the accessory is constructed and arranged to support the portable electronic device on a structure.

13. An adaptor for attachment of an accessory to a portable electronic device, the adaptor comprising:
    a body having a top edge and a bottom edge, a front surface and an opposing back surface, the body being sized smaller than a back surface of the portable electronic device so as to not extend past edges of the back surface of the portable electronic device during use;
    a mounting member including a slot bounded by two opposing side edges, the slot being configured and dimensioned to receive a portion of a grip device supported on the portable electronic device;
    at least one receiving bracket supported on front surface of the body and extending outward from the front surface of the body, the at least one receiving bracket including opposing bracket arms forming a channel configured and dimensioned to receive at least a portion of the accessory therein; and
    wherein during use the grip device is received within the slot of the mounting member to support the adaptor on the portable electronic device and at least a portion of the accessory is removably received within the channel of the at least one receiving bracket to support the accessory on the adaptor.

14. The adaptor of claim 13, wherein the body incudes at least one receiving arm that supports the at least one receiving bracket.

15. The adaptor of claim 13, wherein the opposing bracket arms each include a lower portion and an upper portion, the upper portion of each opposing bracket arm curving inwardly toward the opposing bracket arm.

16. The adaptor of claim 15, wherein the opposing bracket arms each further include a lower surface extending between the lower portion of each of the opposing bracket arms and an inner surface, the lower surface and the inner surface forming the channel.

17. The adaptor of claim 1, wherein the grip device includes a receiving portion, and the two opposing side edges of the mounting member are spaced apart a sufficient distance to accept the receiving portion of the grip device within the slot and wherein the adaptor is rotatable around the grip device.

18. An adaptor kit for a portable electronic device comprising:
   a body having a top edge and a bottom edge, a front surface, and an opposing back surface;
   a grip device including a base constructed and arranged to be supported by a back surface of the portable electronic device;
   a mounting member including a slot bounded by two opposing side edges, the slot being configured and dimensioned to receive a portion of the grip device;
   at least one receiving bracket supported on the front surface of the body and extending outward from the front surface body, the at least one receiving bracket including opposing bracket arms forming a channel configured and dimensioned to receive at least a portion of the accessory therein;
   a flexible accessory configured and sized to fit within the channel of the opposing bracket arms;
   wherein during use the grip device is received within the slot of the mounting member to support the body on the portable electronic device and the flexible accessory is constructed and arranged to be formed into a variety of shapes by the user to support the portable electronic device as a stand or hanging from an object.

19. The adaptor kit of claim 18, wherein the grip device includes the base constructed and arranged to be supported by the back surface of the portable electronic device, a button, and a receiving portion connecting the button and the base.

20. The adaptor kit of claim 19 wherein the flexible accessory includes a tubular shape, a first end and a second end, each end being received within the at least one receiving bracket.

* * * * *